(No Model.)

3 Sheets—Sheet 1.

M. F. FAIRBANK & J. R. MEACH.
KNOTTER MECHANISM FOR GRAIN BINDERS.

No. 530,495.

Patented Dec. 4, 1894.

(No Model.)

3 Sheets—Sheet 2.

M. F. FAIRBANK & J. R. MEACH.
KNOTTER MECHANISM FOR GRAIN BINDERS.

No. 530,495. Patented Dec. 4, 1894.

WITNESSES
E. K. Roemer
E. W. Arnold

INVENTORS
Manford F. Fairbank
Joseph R. Meach
By C. B. Wheeler & Co.
Attorneys.

(No Model.) 3 Sheets—Sheet 3.
M. F. FAIRBANK & J. R. MEACH.
KNOTTER MECHANISM FOR GRAIN BINDERS.
No. 530,495. Patented Dec. 4, 1894.
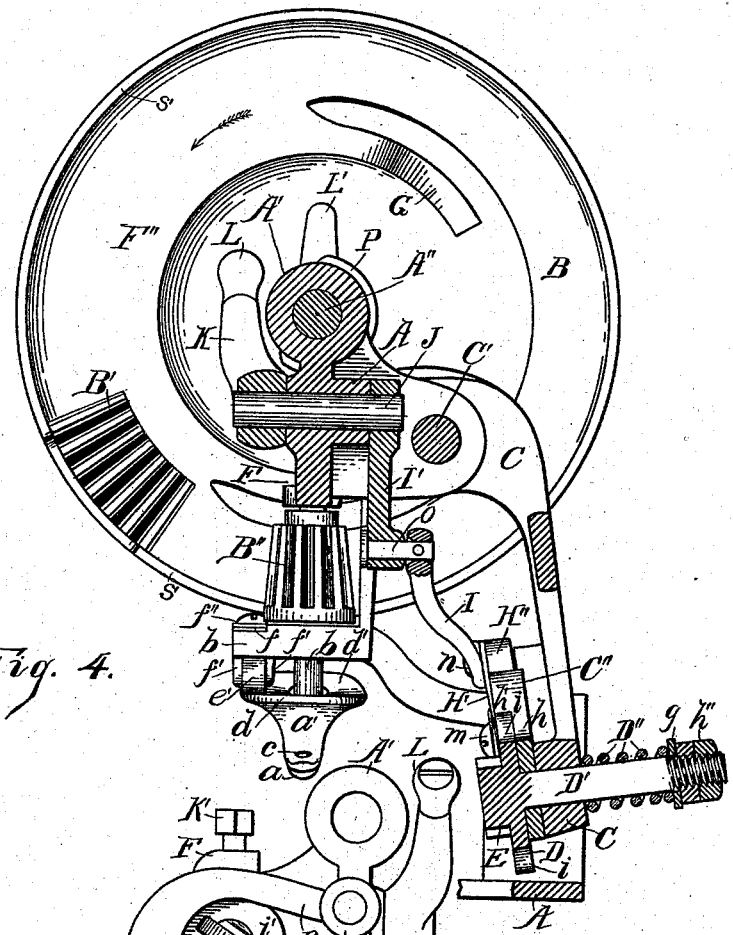
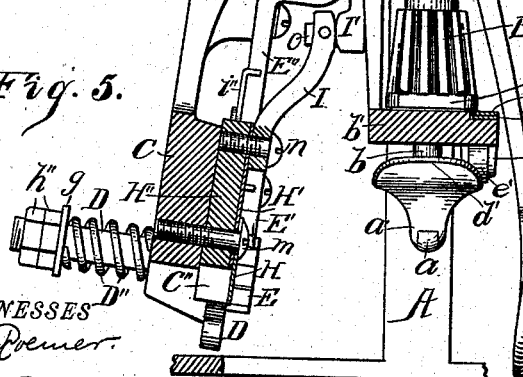
WITNESSES
E. K. Roemer
E. W. Arnold
INVENTORS
Manford F. Fairbank
Joseph R. Meach
By C. B. Wheeler & Co.
Attorneys.

UNITED STATES PATENT OFFICE.

MANFORD F. FAIRBANK AND JOSEPH R. MEACH, OF OGDEN CENTRE, MICHIGAN, ASSIGNORS OF ONE-HALF TO THOMAS MEASURES, OF SAME PLACE, AND DAVIES BROWN, OF SEWARD, OHIO.

KNOTTER MECHANISM FOR GRAIN-BINDERS.

SPECIFICATION forming part of Letters Patent No. 530,495, dated December 4, 1894.

Application filed February 1, 1894. Serial No. 498,691. (No model.)

*To all whom it may concern:*

Be it known that we, MANFORD F. FAIRBANK and JOSEPH R. MEACH, citizens of the United States, residing at Ogden Centre, in the county of Lenawee, State of Michigan, have invented certain new and useful Improvements in Knotter Mechanism for Grain-Binders; and we do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to an improved knotter mechanism for grain binders, and consists in the construction and arrangement of parts as hereinafter fully set forth, the essential features of which being pointed out particularly in the claims.

The objects of the invention are to provide simple and effective means for tying the binding twines so as to form a hard knot therein, and to provide for cutting the twine close to the knotter-bill to effect a saving in the use thereof. These objects are attained by the mechanism illustrated in the accompanying drawings, in which—

Figure 1:
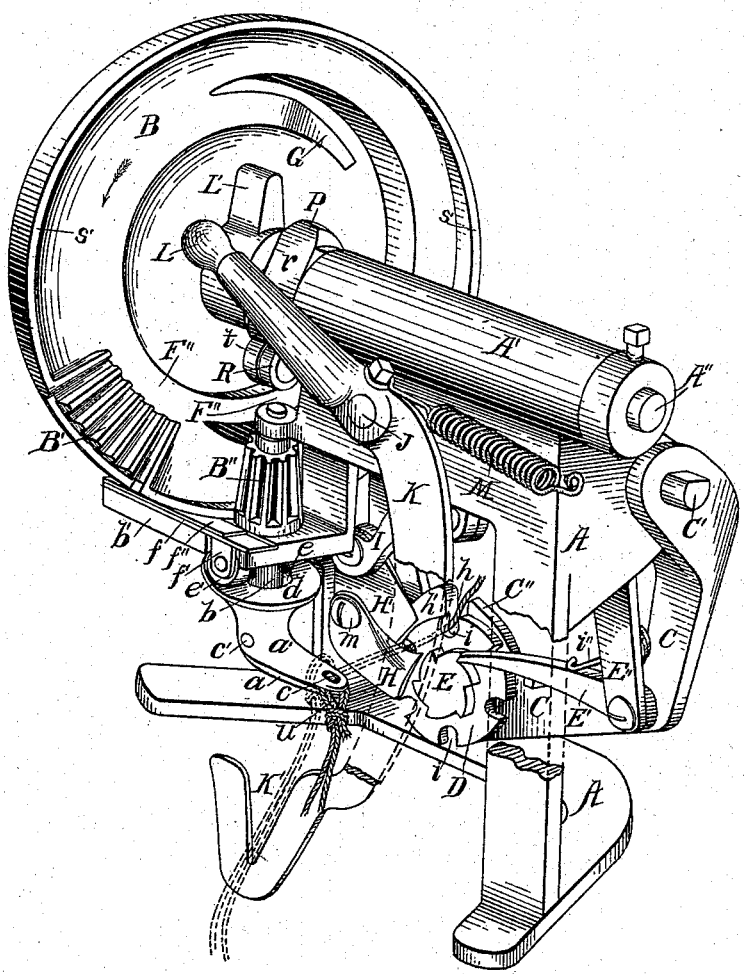
Figure 2:
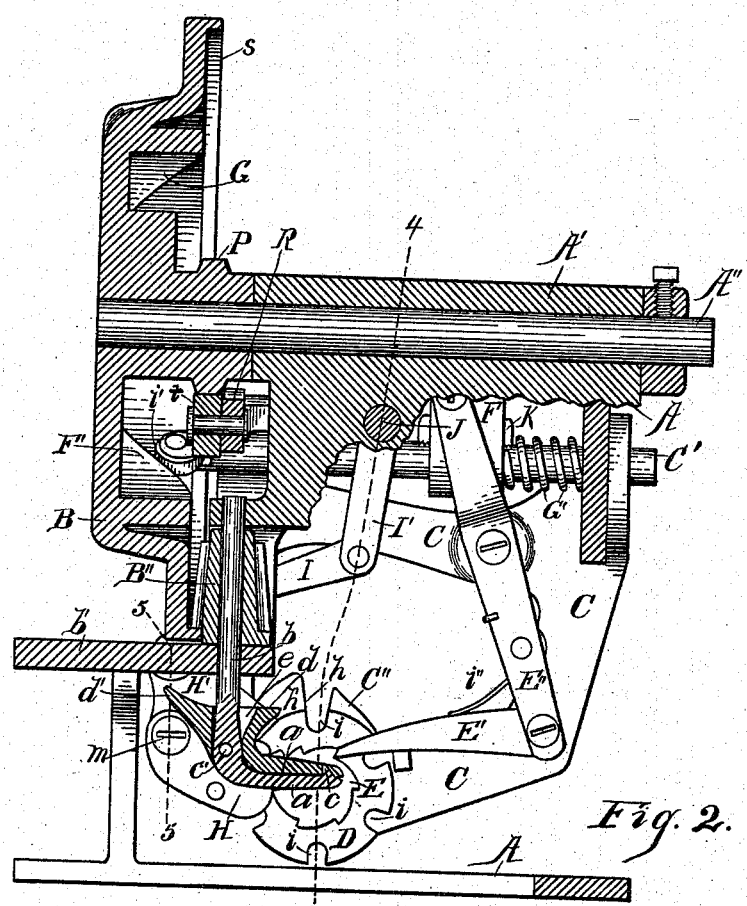
Figure 3:
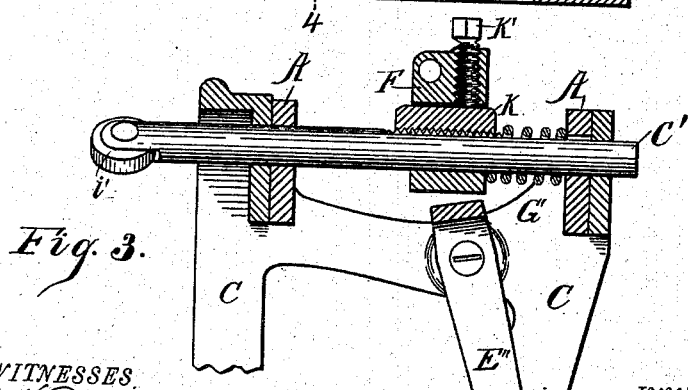

Figure 1 is a general perspective view of the knot tying mechanism, portions being broken away to more clearly show construction of parts. Fig. 2 is a central vertical longitudinal section through Fig. 1, with a portion of the frame broken away. Fig. 3 is a detail partly in section of the mechanism for operating the twine engaging disk. Fig. 4 is a section on dotted line 4—4 of Fig. 2. Fig. 5 is an end elevation partly in section as on dotted line 5—5 of Fig. 2, the driving wheel being removed.

Referring to the letters of reference, A designates the frame upon which the mechanism is mounted. Journaled in a sleeve A' at the top of said frame, is a shaft A" carrying at its end the driving wheel B. On the inner face of said wheel at the perimeter thereof, is a segment of radial gear teeth B', that, as said wheel revolves, are adapted to engage and cause one revolution of the conical pinion B", mounted on the vertical spindle $b$ journaled in the frame, which spindle passes through the horizontal ledge $b'$ of the frame, and is provided at its lower end with the fixed jaw $a$ of the knotter-bill. Said bill consists of said fixed lower jaw having at its outer end the tooth $c$ and the movable upper jaw $a'$ having an aperature or recess that receives said tooth. Said upper jaw is pivoted at $c'$ to the lower jaw and the top thereof is enlarged so as to form a circular table $d$, having a curved inclined plane $d'$ at the back thereof and provided with a central flaring aperture, $e$ that freely receives the spindle $b$ which passes therethrough, thereby permitting of the free movement of the jaw $a'$ upon its pivot.

Let into the outer edge of the ledge $b'$ of the frame, is a plate $f$ having two ears $f'$ depending therefrom through a recess in said ledge, between which ears is journaled an anti-friction roller $e'$, that bears upon the table $d$ of the knotter-bill and rolls thereon as said bill is revolved. The riding of said roller onto the inclined plane $d'$ of said table, causes it to tilt and open the knotter-bill so as to grasp the binding twine in forming the knot as hereinafter set forth.

The plate $f$ to which the roller $e'$ is attached, is resilient and reinforced with a spring leaf $f''$, whereby said roller is held with a yielding force upon the table of the knotter, permitting the parts to adjust themselves and obviating undue wear and friction.

The twine gripping and cutting mechanism is mounted on a swinging frame C hung upon a horizontal shaft C' adapted to have longitudinal movement in its bearings in the main frame A. Secured to the lower portion of the swinging frame upon the inner face thereof, is a plate C", having in the upper edge thereof a deep notch $h$, and at one side of said notch an overhanging curved flange $h'$ adapted to embrace a portion of the periphery of the revoluble disk D which is seated against said plate and provided with a central stem D' that passes through said plate and the frame C, and receives upon its outer end a coiled spring D" which is confined between the washer $g$ thereon and said frame and is retained in place by the nuts $h''$, by which construction, the disk D may be caused to bear against its seat with any degree of tension.

The periphery of the disk D is provided with a series of notches *i* which are caused to successively register with the notch *h* in the seat or plate C'' by means of a ratchet E mounted on the face of said disk, and a pawl E' engaging said ratchet, whereby said disk is intermittently rotated. Said pawl is held by a spring *i''* and actuated by means of a lever E'' fulcrumed near its longitudinal center to the frame C, and to the lower end of which said pawl is pivoted, the upper end of said lever being pivoted to the head F, mounted on the longitudinal movable shaft C', and secured thereto by means of a gib *k* engaging notches on said shaft and held in place by a set screw *k'*, which construction is clearly shown in Fig. 3, and permits of the adjustment of said head to regulate the throw of the lever E'' to compensate for any wear of the pawl E'. The movement of the shaft C' to actuate said lever and pawl is accomplished by means of an incline F' leading from the recess in the inner face of the wheel B to the plane of its raised surface F'', which incline, as said wheel revolves, engages the anti-friction roller *i'* on the inner end of said shaft and moves said shaft longitudinally outward compressing the spring G' thereon between said head and the frame and swinging the lever E'' and operating the pawl E', thereby rotating the ratchet E and the disk D. When the shaft has been thrust outward to the extent of the rise of said incline, it is held extended by the raised surface F'' upon which the roller *i'* rolls as the wheel B continues to revolve, until said roller encounters the decline G leading from the surface F'', when the spring G' will return said shaft to its normal position throwing the lever E'' back and withdrawing the pawl so as to engage a succeeding tooth on the rack E, in position for another operation.

The twine cutting mechanism consists of the fixed lower knife H secured to the swinging frame and standing adjacent to the inner face of the gripper disk D, and the upper movable knife H' mounted on an arm H'', pivoted upon a screw *m* passing through the fixed knife and screwing into the frame C, as clearly shown in Fig. 5. By this construction as the arm H'' is moved, the upper knife H' swings upon the pivot *m* and is caused to shear by the knife H to sever the twine, the position of parts during which operation is clearly shown in Fig. 1.

Pivoted to the upper end of the arm H'' carrying the movable knife, by means of a screw *n*, is a link I, the upper end of which is coupled by means of a form of gimbal-joint to the depending crank I', shown in Fig. 4, in which said link is pivoted to and adapted to rock upon the outer end of the pin *o* which is journaled in the lower end of said crank. This coupling permits said link to reciprocate to actuate the knife H', and allows the frame C carrying said knife to swing inward as the twine is taken up by the knotter-bill.

The crank I' is secured to one end of a rock-shaft J, which passes through and is journaled in the upper portion of the frame A, the opposite end of said shaft carrying the curved guide arm K which extends downward in line with the knotter-bill and is provided with a V-shaped way K' in its lower end that receives and guides the binding twine. The upper end of said arm extends into the recess in the wheel B and is provided with a roller L thereon, that is adapted to be engaged by the lug L' extending from the hub of said wheel as it revolves, which carries the inner end of said arm downward, thereby rocking the shaft J and actuating the crank I' and link I to operating the knife H', as before stated, at the same time swinging the lower end of said arm outward for the purposes hereinafter set forth. When in the revolution of said wheel, the lug L' slips past the roller L on said arm, the spring M attached thereto and to the frame will return said arm thus rocking said shaft back and restoring said knife and its operative parts to their former position.

In the operating of this improved tying mechanism, one end of the binding twine, which is passed around the bundle by the needle, not shown, is secured between the disk D and the seat or plate C'', and extends from the uppermost notch *i* in said disk. The other end of said twine forming the loop around the bundle, is carried by the needle, into said upper notch of the gripper disk and the corresponding notch *h* in the plate C'', when the incline F' of the revolving wheel B engages the roller *i'* on the end of the shaft C', moving said shaft longitudinally and actuating the pawl E' to rotate said disk thereby gripping the twine between its inner face and the plate C'', and carrying it into the opening between the knives, as shown by dotted lines in Fig. 1, at which time the twine extends across the upper face of the knotter-bill and lies in the V-shaped way in the lower end of the arm K. Said bill is then caused to make one revolution by the engagement of the segment of gear teeth B', in the course of the revolution of the wheel B, with the pinion B'', thereby winding the twine on said bill to form the knot in the ordinary manner, the bill opening to receive the twine and closing thereon by the engagement of the inclined plane *d'* of its circular table as it revolves, with the roller *e'* as before described. To hold the bill in position after it has made one revolution, the pinion B'' is provided with a flat surface *s* which is engaged by the lateral flange *s'* extending from the rim of the wheel B, except at the point where the cog-teeth B' are formed, whereby said pinion is permitted to revolve when engaged by said teeth, but is held from further turning by said flange until the wheel shall have completed its revolution. As the bill revolves in winding the twine thereon, the tension of the twine as it is taken up by the bill causes the frame C carrying the knives and gripper disk, to swing inward toward said bill so that the end thereof, as it receives the twine between its jaws, shall pass close to the knives thereby leaving but a short end of twine extending beyond the bill when it is severed. This movement of the frame C is permitted at this time, by a cam P on the hub of the wheel B, the low point r of which encounters a roller t on the end of an arm R of said frame, allowing said arm to rise and the frame to swing inward on the shaft C', said arm being again depressed by the high point of said cam and said frame swung outward after the twine shall have been severed and the knot formed. As the bill completes its revolution with the twine between its jaws, as shown by dotted lines in Fig. 1, the lug L' on the hub of the wheel B engages the roller L on the arm K, depressing the inner end of said arm and rocking the shaft J, thereby actuating the knife H', as before described, to sever the twine, at the same time the lower end of said arm carrying the guide K' with the twine therein, swings outward and slips the twine off of the end of said bill, the loop u of the knot being retained by the tooth c, as shown in Fig. 1, so that when the bundle is discharged, said loop will pull out forming a hard knot, as will be readily understood, the upper jaw not being held with tension, the cut ends of the twine will readily draw through the jaws of the bill. The operation of tying the knot is then completed and the parts are in position for a succeeding operation.

From the drawings and the above description, it will now be apparent, that this improved knotting mechanism is simple, compact and effective, and in which the operation is such as to tie a hard knot in the binding twine and effect a material saving in the use thereof.

Having thus fully set forth our invention, what we claim as new, and desire to secure by Letters Patent, is—

1. The knotter-bill consisting of the fixed jaw on a revoluble spindle, the movable jaw pivoted thereto and having the circular table through which said stem passes freely said table having an inclined plane, and the roller adjacent to said table.

2. In a knotter mechanism, the knotter-bill consisting of the fixed jaw on a revoluble spindle and having an extending tooth, the movable jaw pivoted thereto provided with a recess to receive said tooth and having a circular table surrounding said spindle which passes freely therethrough, a portion of the surface of said table extending above the plane thereof, and the roller adjacent to said table.

3. In a knot tying mechanism, the bill consisting of the fixed jaw on a revoluble spindle, the movable jaw pivoted thereto and having a circular table, a portion of whose surface is raised above the plane thereof and which surrounds said spindle, and the depending spring restrained roller standing contiguous to the surface of said table.

4. In a knot tying mechanism, the combination of the knotter, the hinged frame adapted to swing toward and away from said knotter and carrying the cord holder and cord cutting mechanism consisting of the rotary gripper disk seated against a plate between which and said plate the cord is confined, the fixed knife secured adjacent to the face of said disk and crossing the plane of its periphery, the movable knife so located with respect to the fixed knife that the cord is carried between their cutting edges by said disk, said movable knife being so hinged as to shear by the edge of the fixed knife adjacent to the face of the disk and sever the cord as said frame swings toward said knotter.

5. The combination with the driving wheel, the curved guide arm adapted to be actuated by said wheel, the rock shaft on which said arm is mounted, the crank depending from said shaft, the twine gripping disk, and the fixed and pivoted knives adjacent thereto together with said disk mounted on a hinged frame and the link coupling said pivoted knife to said crank, in such manner as to enable said frame to swing freely substantially as set forth.

6. In a knotter, the combination of the swinging frame carrying the twine gripping mechanism and a fixed and pivoted knife, and having an arm extending therefrom the revoluble knotter-bill, the driving wheel having a cam on the hub thereof which engages said arm and causes said frame to swing inward toward the knotter-bill as the twine winds thereon, said wheel having an incline on its face that actuates a crank to which is loosely attached a link that is pivoted to the pivoted knife and operates said knife to sever the twine, substantially as set forth.

In testimony whereof we affix our signatures in presence of two witnesses.

MANFORD F. FAIRBANK.
JOSEPH R. MEACH.

Witnesses:
BERT R. CLARK,
L. B. ROBERTSON.